United States Patent [19]

Codrington

[11] Patent Number: 4,637,353
[45] Date of Patent: Jan. 20, 1987

[54] PILOT FUEL REGULATING DEVICE

[76] Inventor: Ernest R. Codrington, 1580 Cornell Avenue, Coguitlam, British Columbia V3J 3A1, Canada

[21] Appl. No.: 577,288

[22] Filed: Feb. 6, 1984

[51] Int. Cl.$^4$ .................... F02M 21/02; F02M 43/00
[52] U.S. Cl. ................ 123/27 GE; 123/446; 123/526
[58] Field of Search ............... 123/27 GE, 375, 390, 123/445, 446, 447, 460, 304, 525, 526

[56] References Cited

U.S. PATENT DOCUMENTS

| 4,176,641 | 12/1979 | Perr | 123/390 |
| 4,200,075 | 4/1980 | Takahashi et al. | 123/375 |
| 4,367,709 | 1/1983 | Codrington | 123/339 |
| 4,416,244 | 11/1983 | McDonald | 123/525 X |

FOREIGN PATENT DOCUMENTS 1395969  5/1975  United Kingdom .......... 123/27 GE

Primary Examiner—Tony M. Argenbright
Attorney, Agent, or Firm—Seed and Berry

[57] ABSTRACT

A pilot fuel regulating system includes a pilot fuel governor for supplying varying amounts of pilot fuel to an engine. A piston housed within an elongated bore moves longitudinally therein in response to changing engine speeds to regulate the flow of fuel through the governor. A minor diameter portion and chamfer portion of the piston allow the passage of varying amounts of fuel through the bore. In preferred embodiments, the minor diameter portion is elongated to define a moving reservoir within the bore for dampening fuel pressure oscillations.

1 Claim, 3 Drawing Figures

PILOT FUEL REGULATING DEVICE

DESCRIPTION

1. Technical Field

This invention relates to a fuel system for an engine using mixed fuels, and more particularly, to such a system including a pilot fuel governor.

2. Background Art

Traditionally, vehicle engines have employed gasoline or diesel fuel as a fuel source. In recent years, however, there has been an increased interest in using natural gas as a fuel for vehicle engines as well as other engines that traditionally have operated on petroleum-based fuels. Natural gas will generally burn cleaner than petroleum-based fuels, and, depending upon price and availability, natural gas can be a more economical fuel than gasoline or diesel fuel.

For many uses, it is preferable to convert existing engines to burn natural gas rather than to provide entirely new equipment designed specifically for natural gas use. It is generally cheaper to convert an engine than to replace it entirely. Furthermore, converting an existing engine for use with natural gas can leave open the possibility of alternately using the engine with either petroleum-based products or natural gas. Such dual capacity is often desirable because the cost and availability of both natural gas and petroleum-based products will vary in different locations and will change over time.

Unlike diesel fuel, natural gas will not ignite spontaneously under cylinder pressures found in most diesel engines. Thus, an engine designed to run solely on natural gas must include an ignition system for providing a spark to ignite the natural gas within the cylinders. Conventional gasoline engines include such a spark ignition system and thus they are well adapted for conversion to burn natural gas. A diesel engine, on the other hand, operates by compressing diesel fuel within its cylinders until the fuel reaches a pressure at which it will spontaneously ignite. To run a conventional diesel engine on natural gas, it is thus necessary to either provide an add-on ignition system or to mix a pilot fuel capable of spontaneous ignition with the natural gas.

For a conventional diesel engine converted for use with natural gas, the amount of pilot fuel required for an operable fuel mixture will vary as a function of engine speed. It has been found, for example, that the Cummins diesel engine converted for use with natural gas will require almost entirely pilot fuel for optimum operation at idle speeds, and yet will operate on as little as 13% pilot fuel at higher rpm's. The range of pilot fuel required may, of course, vary for different engines and different uses of particular engines.

Existing natural gas conversion units for diesel engines are capable of introducing quantities of natural gas into a turbo charging system installed on the engine such that the amount of natural gas fed into the engine cylinders will increase as a function of increased pressure in the turbocharger and hence increased engine speed. It is desirable to provide an effective means of introducing varying amounts of pilot fuel into such a system to allow efficient operation. It is also desirable to provide a fuel system for use with such a converted engine which will enable the engine to run either with conventional diesel fuel or a mixture of an alternate fuel and a pilot fuel.

DISCLOSURE OF INVENTION

It is an object of this invention to provide an apparatus for controlling the amount of pilot fuel introduced into a mixed fuel system.

It is another object of this invention to provide a system which will operate solely on a first fuel or alternately on a mixed fuel wherein varying amounts of the first fuel can be introduced into a fuel mixture to function as a pilot fuel.

These and other objects of the invention which will become more apparent as the invention is more fully described below are obtained by providing a fuel system for an engine which includes a pilot fuel governor which, when activated, supplies varying amounts of pilot fuel to the engine. In a preferred embodiment, pilot fuel from a pump governor passes through an elongated bore within the pilot fuel governor. A piston housed within the bore moves longitudinally therein in response to changing engine speeds. The piston includes a minor diameter portion and chamfer portion which are specially shaped to vary the flow of fuel through the pilot fuel governor at a desired rate as the piston moves longitudinally in response to changes in the engine speed.

In a preferred embodiment, the piston is shaped to include an elongated minor diameter portion forming a reservoir within the bore to dampen fluctuations in the fuel pressure.

In preferred embodiments, the pilot fuel governor can be activated and deactivated in conjunction with a fuel pump solenoid to enable an engine to operate in a first mode using only diesel fuel or in a second mode using a mixture of pilot fuel and natural gas or the like.

BEST MODE FOR CARRYING OUT THE INVENTION

Figure 1:
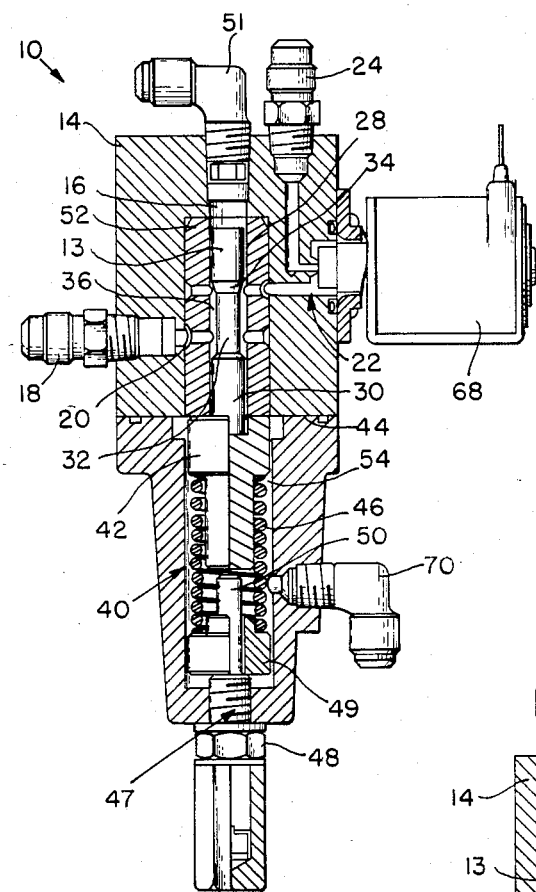
FIG. 1 is a front elevation view of a preferred embodiment of the pilot fuel governor of this invention cut away to illustrate the interior of the pilot fuel governor operating at a relatively low speed.

In preferred embodiments of the present invention, a fuel control system including a pilot fuel governor 10 regulates the amount of diesel fuel that will be mixed with natural gas for compression and combustion within an engine. The pilot fuel governor is hydraulically coupled to a fuel pump 12 which is driven directly by the engine to supply fuel at pressures which vary directly in proportion to the engine speed. A piston 13 within the pilot fuel governor moves linearly in response to changes in the fuel pressure to regulate fuel flow as a function of engine speed. Thus, when the engine is running at low rpm's, the fuel pump generates a relatively low fuel pressure and the pilot fuel governor permits a relative high flow of diesel fuel to the engine. As the engine speeds up, the fuel pump will increase the fuel pressure causing the pilot fuel governor to proportionally meter the flow of diesel fuel to provide the amount of diesel fuel required for the proper fuel mixture.

The operation of the pilot fuel governor can best be explained with reference to the preferred embodiment illustrated in FIGS. 1 and 2. A pilot fuel governor 10 includes a main body 14 having a central bore 16 extending longitudinally therethrough. Fuel for combustion enters the pilot fuel governor through an inlet coupling 18 and travels to the central bore through an inflow passageway 20. From the central bore, the fuel travels through an outflow passageway 22 and exits the governor via an outflow coupling 24. A specially shaped piston 13 is housed within the central bore to regulate the amount of fuel which can pass from the inflow passageway to the outflow passageway.

The piston regulates the flow of fuel through the pilot fuel governor by restricting the amount of the fuel which can pass out of the central bore and into the outflow passageway. The piston includes major diameter portions 28, 30 which are sized to fit slidably within the central bore and substantially block the passage of fuel through the bore when properly aligned with the inflow passageway or outflow passageway. A minor diameter portion 32 and chamfer portion 34 are positioned intermediate the major diameter portions of the piston and, during operation, are aligned in a plurality of positions with respect to the outflow passageway to define a control passage which enables regulated amounts of fuel to pass between the inflow passageway and the outflow passageway.

Figure 2:
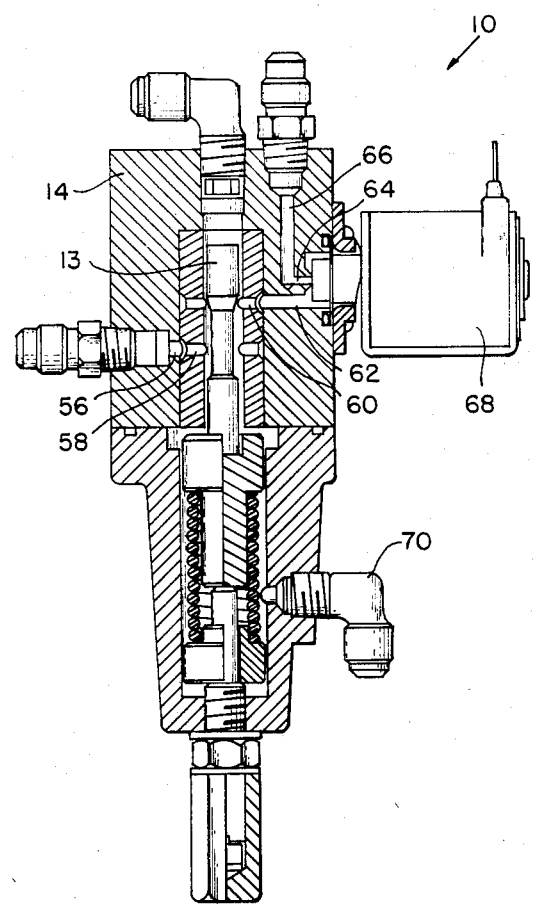
FIG. 2 is a front elevation view of the embodiment of FIG. 1 illustrating the position of the pilot fuel governor when the engine is operating at a relatively high speed.

During operation of the engine at relatively low speeds, the piston is positioned within the central bore in approximately the position illustrated in FIG. 1. The minor diameter portion 32 is aligned with the inflow passageway permitting fuel to enter a moving reservoir 36 created between the minor diameter portion of the piston and the walls of the central bore. The lower part of the chamfer portion of the piston is aligned with the outflow passageway to permit a relatively unrestricted passage of fuel from the reservoir into the outflow passageway. When the engine speeds up, the piston is displaced downwardly to the position such as the one illustrated in FIG. 2. The chamfer portion moves downwardly with respect to the outflow passageway to restrict the flow of fuel from the reservoir to the outflow passageway. If the engine slows down, the piston will be displaced upwardly, so that the lower region of the chamfer portion and/or the minor diameter portion will be aligned with the outflow passageway to increase the flow of fuel between the reservoir and the outflow passageway.

The shape of the chamfer portion can be modified as required to produce the desired flow of fuel at various operating speeds. For some Cummins diesel engines, it is believed, for example, that a straight bevel inclined approximately 3° from vertical will provide acceptable results for many uses. It is not necessary that the chamfer portion have a straight line inclination, as illustrated in FIGS. 1 and 2. Other configurations, such as a non-straight line curve may be preferable for certain applications. The chamfer portion may thus be "contoured" in configurations other than that illustrated herein and it is not intended to limit the invention to the specific configurations used in the preferred embodiments illustrated herein.

While the embodiment illustrated herein the inflow passageway and outflow passageway communicate with the central bore at different elevations, it is possible to align them longitudinally on the central bore. In such an arrangement, the reservoir will effectively be eliminated and the area between the piston and the sidewalls of the central bore will define a passageway of varying size to regulate the flow of fuel from the inflow passageway to the outflow passageway. When utilizing a fuel source which is pressurized by a gear pump operated directly from the engine, it is preferred to use an arrangement including a reservoir as the reservoir will dampen the fluctuations and fuel pressure which are normally created by such a pump.

The position of the piston within the central bore is controlled by the interaction of a spring assembly 40 beneath the piston and pressurized fluid acting downwardly on the top of the piston. The spring assembly includes a piston engaging member 42 which preferably includes a bore 44 therein which is sized to receive the bottom portion of the piston. A coil spring 46 engages the piston engaging member to bias the piston upwardly. The position of the spring can be adjusted by means of an adjustable screw assembly 47 at the bottom of the pilot fuel governor. Rotation of screw 48 of the exterior of the governor will vertically displace a traveling guide 49 in the interior of the governor. The lower end of the coil spring rests on the top of the traveling guide so that vertical displacement of the traveling guide will vary the force of the spring acting on the piston. Stop member 50 adjusts independently of the traveling guide and extends above the traveling guide to prohibit downward movement of the piston beyond a desired level. The stop member may be adjusted as desired to define the minimum fuel flow through the pilot fuel governor. In the position illustrated in FIG. 2, for example, further downward movement of the piston cannot occur as the piston engaging member is in contact with the stop member. Consequently, the major diameter portion 28 of the piston cannot be aligned with the outflow passageway to substantially block the fuel flow. For the stop member position illustrated in FIG. 2, the piston position illustrated therein represents the minimum fuel flow. The spring assembly thus defines the position of the piston and the amount of force required to displace the piston downwardly.

Downward movement of the piston is caused by pressurized fluid acting on the top of the piston. A fuel pressure coupling 51 at the top of the pilot fuel governor communicates with the fuel pump to supply pressurized fluid to the central bore. This fluid will act on the top of the piston. When the engine reaches a speed sufficient to generate fuel pressure capable of overcoming the upward biasing forces of the spring assembly, the piston will move downwardly to reduce the flow of fuel through the pump governor.

In the preferred embodiment illustrated in FIG. 1, the main body 14 is fabricated of cast aluminum or the like. A tubular insert 52 is positioned within a central cavity 54 to define the central bore. The central cavity extends downwardly to house the spring assembly as shown. The inflow passageway is defined by a bore 56 through the main body and a bore 58 through the tubular fitting. The outflow passageway is defined by a second bore 60 through the tubular fitting and interconnected bores 62, 64, and 66 extending through the main body. Passage of fuel through the outflow passageway can be terminated by deactivating a solenoid 68 to shut off the flow of fuel between bores 62 and 64 of the outflow passageway. A suitable arrangement for such a shutoff system is disclosed in U.S. Pat. No. 4,291,657.

The pilot fuel governor includes a drain coupling 70 communicating with the lower portion of the central cavity adjacent the spring assembly. The drain coupling communicates with tank line 72 to allow fuel which may seep into the lower part of the cavity to return to the fuel tank. The coupling additionally provides a vent for the pilot fuel governor to prevent the buildup of pressure therein which might inhibit the movement of the piston.

Figure 3:
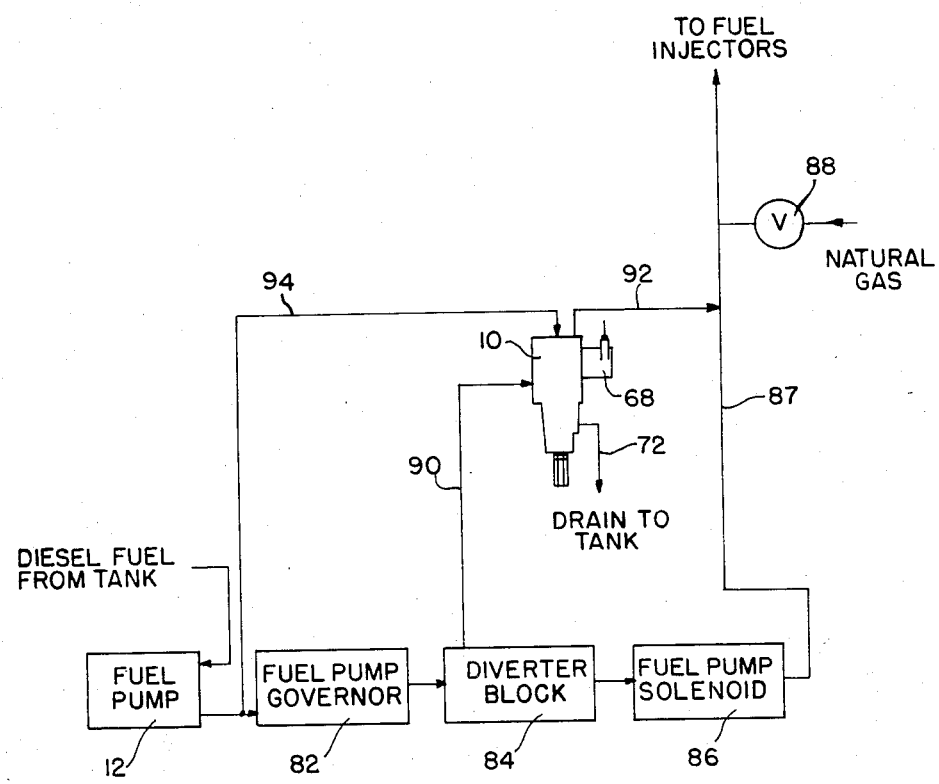
FIG. 3 is a schematic diagram illustrating a fuel system in accordance with this invention.

FIG. 3 illustrates the operation of the pilot fuel governor within the fuel system of a diesel engine converted for use with natural gas. Fuel from the fuel tank (not shown) enters the fuel pump 12 where it is pressurized in direct proportion to the engine speed. When set for operation on diesel fuel alone, the pilot solenoid 68 is in a closed position to block the flow of fuel through the pilot fuel governor. Fuel travels from the fuel pump into a conventional fuel pump governor 82, through a diverter boock 84, and through a conventional fuel pump solenoid 86 which is in an open position to enable the diesel fuel to travel to the fuel injector line 87. The flow of natural gas to the fuel injectors is blocked by electronically actuated shut off means (not shown).

When it is desired to operate the engine using a mixed natural gas fuel, the natural gas shutoff means is electronically actuated to allow the inflow of natural gas. A natural gas valve 88 will regulate the flow of natural gas to the fuel injectors as a function of the engine speed. The pilot fuel solenoid and fuel pump solenoid are simultaneously actuated to permit the flow of fuel through the fuel pump governor and block the flow of fuel from the diverter block through the fuel pump solenoid. Fuel from diverter block line 90 passes through the pilot fuel governor and into outflow line 92 to the fuel injectors. A pressurized fuel line 94 feeds fuel from the fuel pump to the pilot fuel governor to regulate the position of flow as described above.

While it is possible to use fuel which has passed through the fuel pump governor as pressurized fuel for regulating the piston position, it is preferable to obtain the pressurized fuel from a location in the fuel system which is not controlled by the fuel pump governor. Such an arrangement will avoid the following problem. In a diesel truck engine, the fuel pump governor is designed to prevent the engine from operating above a preset speed. If the engine exceeds the preset speed because, for example, the vehicle is traveling downhill, the fuel pump governor is designed to shut off the glow of fuel. Under such condition, if fuel downstream of the fuel pump governor is used to pressurize the piston within the pilot fuel governor, the pilot fuel governor will react as if the engine were traveling at reduced speeds and move the piston into a position to allow maximum flow of fuel through the fuel pump governor. When the engine speed dropped below the preset speed and fuel was again allowed to pass through the fuel pump governor, the immediate effect would be to allow a large amount of fuel to pass through the fuel injectors. The pilot fuel governor would sense that the engine was operating at very low rpm's and required a large flow of pilot fuel, despite the fact that the engine was traveling at a high speed. Thus, pilot fuel will be dumped into the cylinders, causing the engine to momentarily race.

While such a result may not adversely affect the engine, it is believed to be undesirable in that it may startle or concern the operator of the vehicle.

While the invention has been described and disclosed herein with respect to particular preferred embodiments, it is not intended that the invention be seen as limited to these embodiments. Many modifications will be apparent and produce devices which operate with the spirit of the present invention. It is intended then that the present invention include all embodiments equivalent to those disclosed herein which are within the spirit of the invention.

I claim:

1. A fuel system for use in a diesel engine converted to burn a fuel mixture of natural gas and a pilot fuel, the fuel system including a fuel pump coupled to the engine drive shaft for supplying pilot fuel to the engine at pressures proportional to the speed of the engine, wherein the improvement comprises:

a pilot fuel governor in fluid comminication with the fuel pump for regulating the flow of pilot fuel to the engine when the pilot fuel governor is actuated, the pilot fuel governor comprising:

a main body having an elongated bore;

an inflow passageway extending between the exterior of the main body and the bore for the passage of incoming fuel into the bore;

an outflow passageway extending between the bore and the exterior of the main body for the passage of outgoing fuel from the bore;

a piston slidably mounted in the bore to regulate the flow of fuel passing through the bore, the piston including a major diameter portion, a minor diameter portion and a contoured portion therebetween which are alignable in a plurality of positions with respect to the inflow passageway and outflow passageway to define a control passage in the bore which permits a preset amount of fuel to pass between the inflow passageway and the outflow passageway, the preset amount varying and being determined by the longitudinal position of the piston within the bore;

means for biasing a piston toward a first end of the bore;

the fuel pump communicating with the piston to oppose the biasing means and displace the piston toward the second end of the bore when the speed of the engine creates sufficient pressure;

an alternate pilot fuel path for supplying unregulated amounts of fuel to the engine when the pilot fuel governor is deactivated; and means for alternately activating the pilot fuel governor and alternate pilot fuel path such that when the pilot fuel governor is activated, a regulated amount of pilot fuel will flow to the engine, and when the alternate pilot fuel path is activated, an unregulated amount of pilot fuel will flow to the engine for use as a primary fuel source.

* * * * *